US012640612B2

(12) United States Patent
Mori

(10) Patent No.: US 12,640,612 B2
(45) Date of Patent: May 26, 2026

(54) ACTUATOR

(71) Applicant: NIDEC INSTRUMENTS CORPORATION, Nagano (JP)

(72) Inventor: Akira Mori, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 242 days.

(21) Appl. No.: 18/624,116

(22) Filed: Apr. 2, 2024

(65) Prior Publication Data

US 2024/0333071 A1 Oct. 3, 2024

(30) Foreign Application Priority Data

Apr. 3, 2023 (JP) ................................. 2023-059979

(51) Int. Cl.
*H02K 5/04* (2006.01)
*H02K 1/2706* (2022.01)

(52) U.S. Cl.
CPC ............. *H02K 5/04* (2013.01); *H02K 1/2706* (2013.01)

(58) Field of Classification Search
CPC .......... H02K 5/00; H02K 5/04; H02K 1/2706; H02K 1/27; H02K 1/22; H02K 33/00; H02K 33/02; H02K 33/04; H02K 33/06; H02K 33/08; H02K 35/02; H02K 35/04; H02K 1/24; H02K 5/24; H02K 7/061; H02K 7/065
USPC .......................................................... 310/15
See application file for complete search history.

(56) References Cited

U.S. PATENT DOCUMENTS

| | | | | |
|---|---|---|---|---|
| 7,380,989 B2 * | 6/2008 | Murata | ................. | F16C 33/103 |
| | | | | 384/114 |
| 8,876,385 B2 * | 11/2014 | Harada | ............... | F16C 32/0629 |
| | | | | 384/114 |
| 9,989,091 B2 * | 6/2018 | Komatsubara | ........ | F16C 33/106 |
| 2021/0305878 A1 * | 9/2021 | Hinata | .................. | H02K 33/16 |
| 2022/0123644 A1 * | 4/2022 | Kitahara | ............... | H02K 33/18 |
| 2024/0006108 A1 | 1/2024 | Mori | | |

FOREIGN PATENT DOCUMENTS

| | | | | |
|---|---|---|---|---|
| JP | 2006280046 A | * 10/2006 | ........... | H02K 5/1675 |
| JP | 2021136782 A | * 9/2021 | | |

OTHER PUBLICATIONS

Machine Translation of JP 2006280046 A (Year: 2006).*
Machine Translation of JP 2021136782 A (Year: 2021).*

* cited by examiner

*Primary Examiner* — Alexander A Singh
*Assistant Examiner* — Charlie Frank Mann, Jr.
(74) *Attorney, Agent, or Firm* — HAUPTMAN HAM, LLP

(57) ABSTRACT

An actuator including a support having a tubular case and an outer frame inside the case, a movable body having a shaft at a center of the case and an inner frame holding the shaft from an outer peripheral side, a connection body connected with the outer frame and the inner frame and having at least one of elasticity and viscoelasticity, and a magnet and a coil structured to relatively move the movable body along the shaft with respect to the support. The inner frame includes a first member made of resin whose outer peripheral face is connected with the connection body and a second member made of metal which is fitted to an inner side of the first member, and the shaft is fixed to the first member through the second member by press-fitting the shaft to a center hole of the second member.

7 Claims, 5 Drawing Sheets

ACTUATOR

CROSS REFERENCE TO RELATED APPLICATION

The present invention claims priority under 35 U.S.C. § 119 to Japanese Application No. 2023-059979 filed Apr. 3, 2023, the entire content of which is incorporated herein by reference.

TECHNICAL FIELD

At least an embodiment of the present invention may relate to an actuator which is structured to relatively move a movable body with respect to a support body.

BACKGROUND

As an actuator, a structure has been proposed which includes a connection body connected with a movable body and a support body and a magnetic drive mechanism which is structured to move the movable body with respect to the support body. In Japanese Patent Laid-Open No. 2022-083510 (Patent Literature 1), an actuator in which a gel state member is used as a connection body is described. In the actuator described in Patent Literature 1, a support body includes a cylindrical case. A movable body includes a magnet and a yoke and a support shaft penetrating through centers of the magnet and the yoke, and both ends in an axial line direction of the support shaft are connected with the case through a connection body in a cylindrical tube shape. The connection body is a gel state member.

The gel state member in a cylindrical tube shape is disposed between an inner frame member and an outer frame member in a tube shape and connects the inner frame member with the outer frame member. The inner frame member is fixed to the support shaft which is a part on the movable body side, and the outer frame member is fixed to the case through a coil holder which is a part on the support body side.

In Patent Literature 1, a first member made of metal is used as the inner frame member which connects the gel state member with the support shaft. The inner frame member is, for example, manufactured by shaving processing and is fixed to the support shaft by press fitting. However, among parts of the actuator, a cost of the inner frame member which is a metal shaving part is high and thus, the cost is required to be reduced. When material of the inner frame member is replaced with resin whose cost is cheap, fixed strength to the support shaft may be insufficient.

Further, in Patent Literature 1, the inner frame member is joined to an inner peripheral face of the connection body, and the outer frame member is joined to an outer peripheral face of the connection body and thereby, the connection body which is a gel state member is easily handled. However, press-fitting work of the inner frame member to the support shaft is required to perform in a state that the connection body (gel state member) has been joined to the inner frame member and thus, the connection body may be damaged at the time of assembling. For example, when the inner frame member is to be held by a press-fitting jig, the connection body may be damaged by the jig. Therefore, careful handling of parts is required and assembling work is difficult.

SUMMARY

In view of the problem described above, at least an embodiment of the present invention may advantageously provide an actuator which is capable of reducing a component cost of the inner frame member, securing fixed strength of the inner frame member to the support shaft, and enhancing assembling easiness of the actuator.

According to at least an embodiment of the present invention, there may be provided an actuator including a support body having a case in a tube shape and an outer frame part disposed on an inner side with respect to the case, a movable body having a support shaft which is disposed at a center of the case and an inner frame part which holds the support shaft from an outer peripheral side, a connection body which is connected with the outer frame part and the inner frame part and has at least one of elasticity and viscoelasticity, and a magnetic drive mechanism which includes a magnet and a coil and is structured to relatively move the movable body in an axial line direction of the support shaft with respect to the support body. The inner frame part includes a first member made of resin whose outer peripheral face is connected with the connection body and a second member made of metal which is press-fitted to an inner side of the first member, and the support shaft is fixed to the first member through the second member by press-fitting the support shaft to a center hole of the second member.

According to this embodiment, the inner frame part provided in the movable body and the outer frame part provided in the support body are connected with each other through the connection body. In the inner frame part, a part (first member made of resin) connected with the connection body and a part (second member made of metal) into which the support shaft is press-fitted are separately provided from each other, and the inner frame part is structured by assembling the two parts. According to this structure, a size of a metal part (second member) for securing fixed strength to the support shaft can be reduced and thus, a component cost is reduced. Further, a part (second member) to which the support shaft is press-fitted and fixed is capable of separating from a part (first member) which is connected with the connection body and thus, handling of parts at the time of press-fitting is easy and a risk that the connection body is damaged is reduced. Therefore, reduction of a component cost of the inner frame part is attained, fixed strength to the support shaft of the inner frame part is secured, and assembling easiness of the actuator can be enhanced.

In this embodiment, it is preferable that the second member is a pressed product which is provided with a plate part in a flat plate shape and a rising part which rises from an edge of the center hole penetrating through a center of the plate part. According to this structure, a cost of the second member can be reduced. Further, a press-fitting margin for the support shaft can be secured by providing the rising part. Therefore, fixed strength of the support shaft to the second member can be secured.

In this embodiment, it is preferable that the first member is provided with an outer side tube part whose outer peripheral face is connected with the connection body, an inner side tube part which is disposed on an inner side with respect to the outer side tube part, and a connection part which is protruded from an inner peripheral face of the outer side tube part and is connected with the inner side tube part, the second member is fitted to an inner side of the outer side tube part, and the support shaft is fitted to an inner side of the inner side tube part in a transition fitting state. According to this structure, the support shaft and the first member can be easily assembled and thus, even in a state that the connection body is joined to the first member, a risk that the connection body is damaged is reduced. Further, when the first member is to be manufactured, a thickness removal part can be provided between the outer side tube part and the inner side tube part and thus, wall thickness of a portion to which the support shaft is fitted is prevented from becoming too large.

In this embodiment, it is preferable that a wall thickness of the outer side tube part and a wall thickness of the inner side tube part are substantially same as each other. According to this structure, uniformity of wall thickness of respective parts of the first member can be enhanced. Therefore, molding defects can be suppressed.

In this embodiment, the connection body is a gel state member. A gel state member is a viscoelastic body and, when the gel state member is deformed in a shearing direction, a linear component of its spring constant is larger than a non-linear component and thus, as vibration characteristics of the movable body, vibration characteristics in which linearity is satisfactory can be obtained. Further, when the gel state member is deformed in a compression direction, its spring constant becomes about three times of the spring constant when deformed in a shearing direction and thus, the movable body is suppressed from moving in a direction different from a vibration direction. Therefore, collision of the movable body with the support body can be suppressed.

In this embodiment, it is preferable that the inner frame part, the connection body and the outer frame part are disposed at both ends in the axial line direction of the support shaft. According to this structure, the movable body can be held at both ends in the axial line direction through the connection bodies. Therefore, the movable body can be stably vibrated.

In this embodiment, it is preferable that the coil is disposed in the support body, the movable body includes the magnet disposed on an inner side with respect to the coil and a yoke overlapped in the axial line direction with the magnet, and the support shaft penetrates through centers of the magnet and the yoke. According to this structure, a weight of the movable body can be secured by the magnet and the yoke. Therefore, the intensity of vibration outputted from the actuator can be increased.

Effects of the Invention

According to at least an embodiment of the present invention, the inner frame part provided in the movable body and the outer frame part provided in the support body are connected with each other through the connection body. The inner frame part is structured by assembling two separate members, i.e., a part (first member made of resin) connected with the connection body and a part (second member made of metal) into which the support shaft is press-fitted. According to this structure, a size of a metal part (second member) for securing fixed strength to the support shaft can be reduced and thus, a component cost is reduced. Further, a part (second member) to which the support shaft is press-fitted and fixed is capable of being separated from a part (first member) which is connected with the connection body and thus, handling of parts at the time of press-fitting is easy and a risk that the connection body is damaged is reduced. Therefore, reduction of a component cost of the inner frame part is attained, fixed strength to the support shaft of the inner frame part is secured, and assembling easiness of the actuator can be enhanced.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION (Entire Structure)

Figure 1:
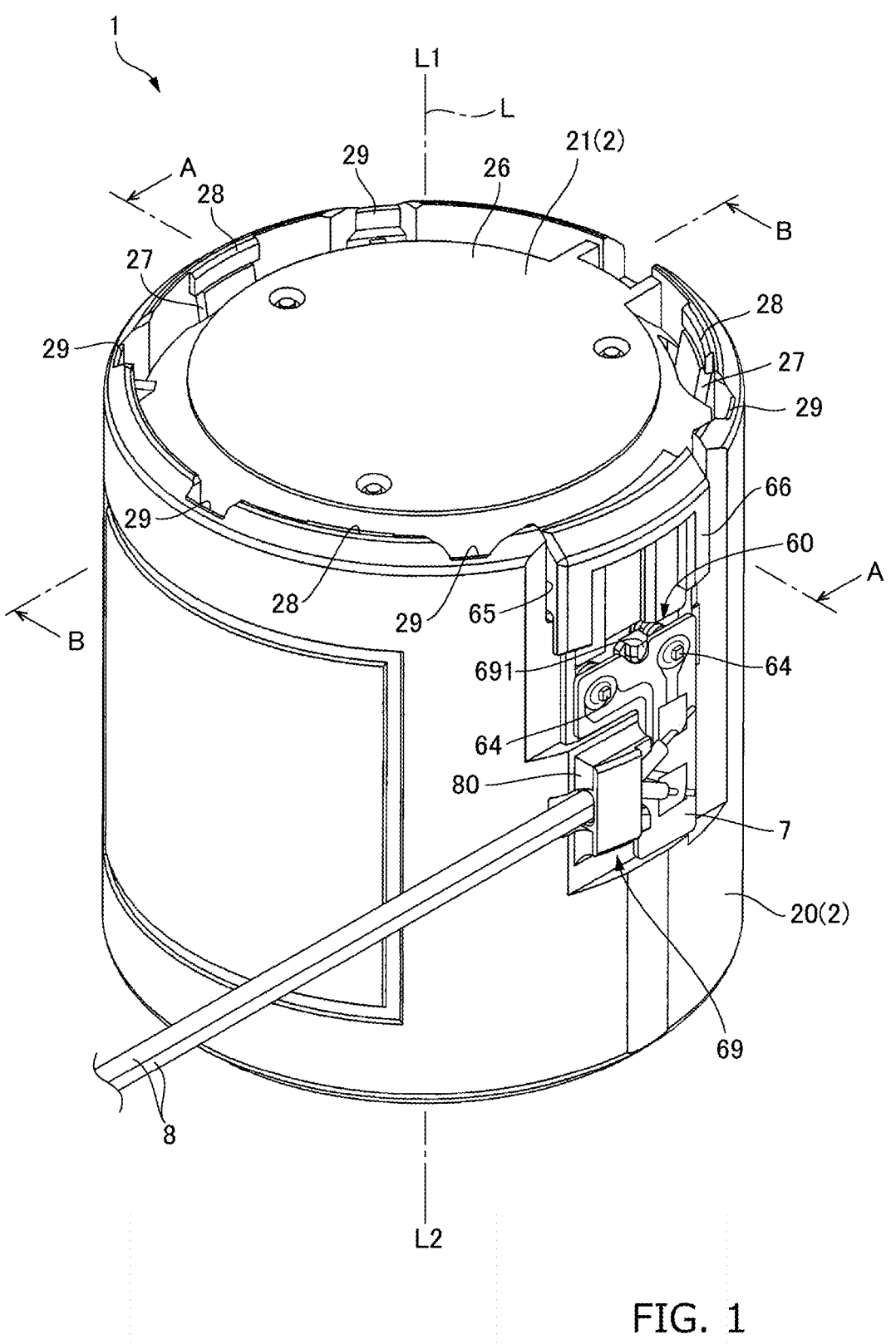
FIG. 1 is a perspective view showing an actuator in accordance with an embodiment of the present invention.
Figure 2:
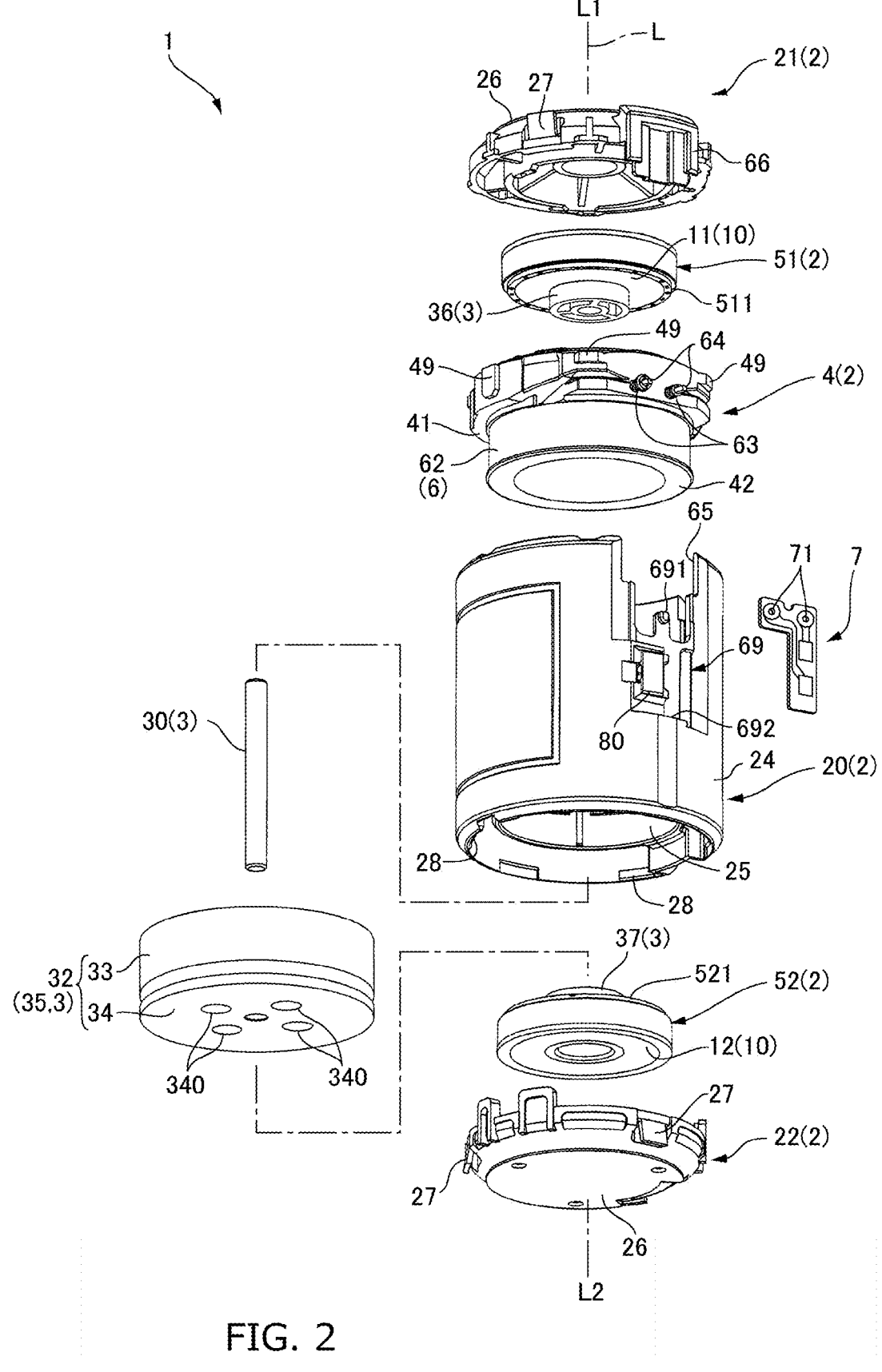
FIG. 2 is an exploded perspective view showing the actuator in FIG. 1.
Figure 3:
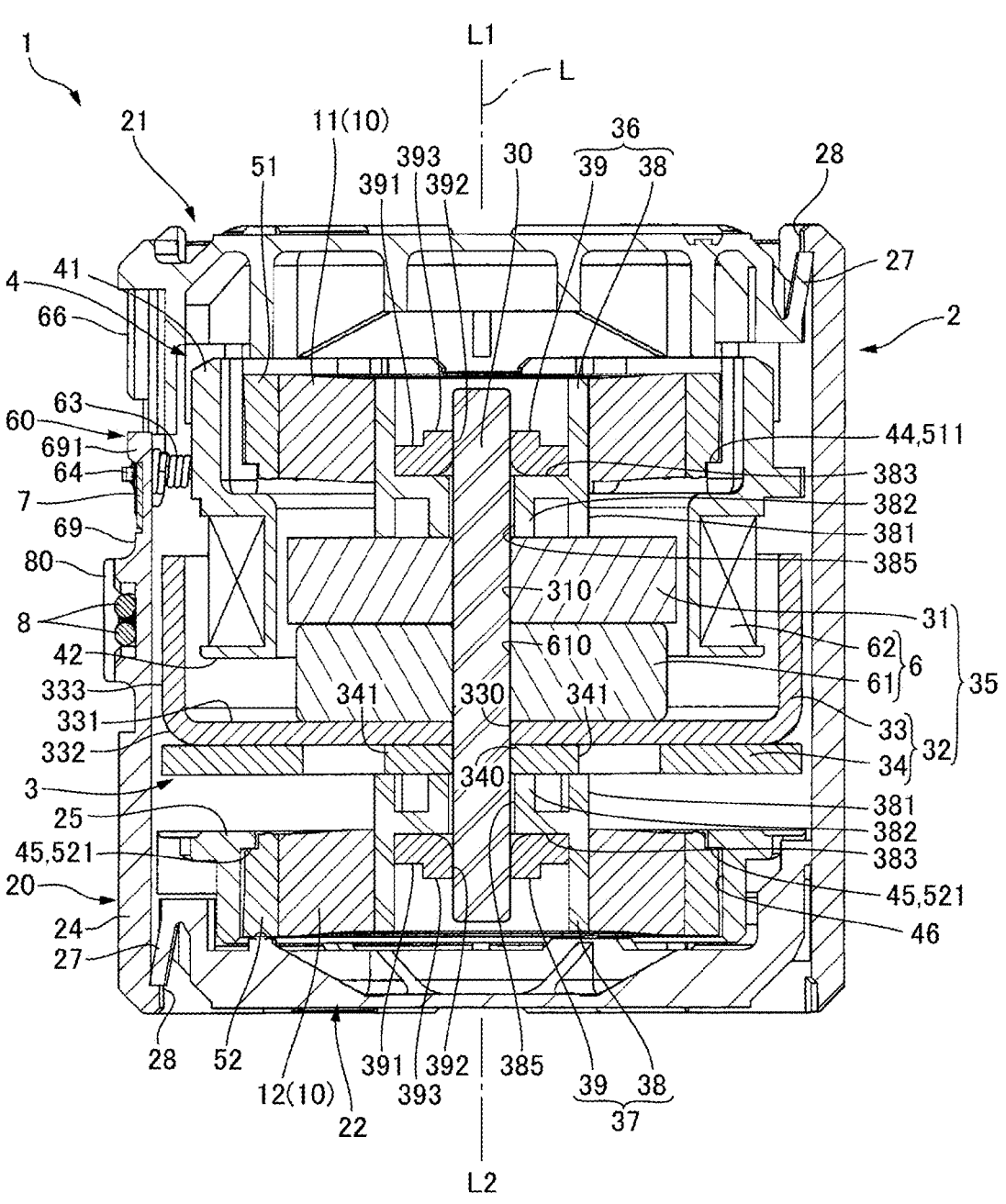
FIG. 3 is a cross-sectional view showing the actuator in FIG. 1 ("A-A" cross-sectional view in FIG. 1).
Figure 4:
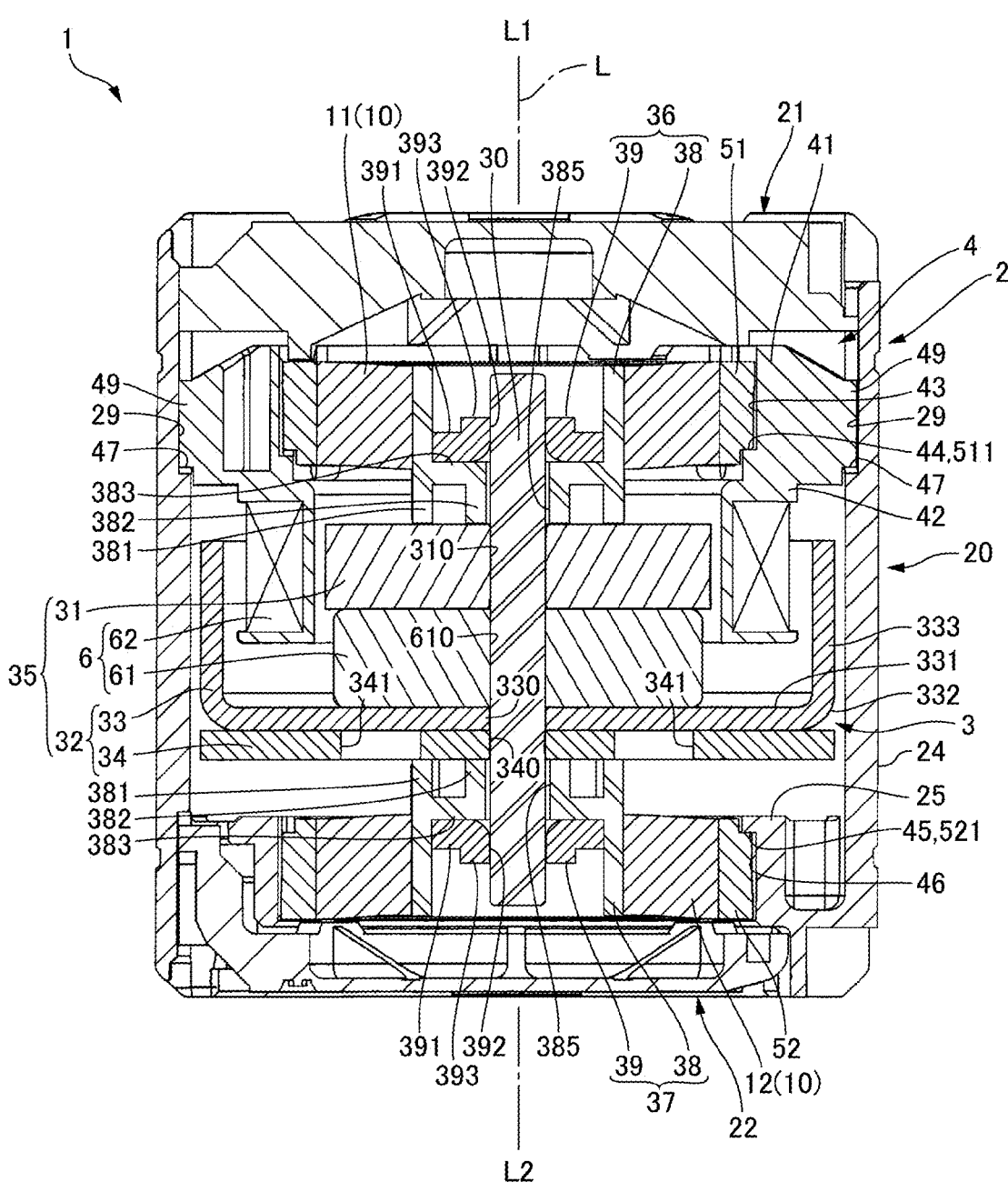
FIG. 4 is a cross-sectional view showing the actuator in FIG. 1 ("B-B" cross-sectional view in FIG. 1).

An embodiment of the present invention will be described below with reference to the accompanying drawings. FIG. 1 is a perspective view showing an actuator 1 in accordance with an embodiment of the present invention. FIG. 2 is an exploded perspective view showing the actuator 1 in FIG. 1. FIGS. 3 and 4 are cross-sectional views showing the actuator 1 in FIG. 1. FIG. 3 is a cross-sectional view showing the actuator 1 which is cut at the "A-A" position in FIG. 1. FIG. 4 is a cross-sectional view showing the actuator 1 which is cut at the "B-B" position in FIG. 1 and is cut in a direction perpendicular to the view in FIG. 3. In the following descriptions, a direction in which a center axial line "L" of a movable body 3 is extended is defined as an axial line direction, one side in the axial line direction is referred to as "L1", and the other side in the axial line direction is referred to as "L2".

As shown in FIGS. 1 through 4, an actuator 1 includes a support body 2, a movable body 3, a connection body 10 which is connected with the support body 2 and the movable body 3, and a magnetic drive mechanism 6 structured to relatively move the movable body 3 with respect to the support body 2. The connection body 10 is provided with at least one of elasticity and viscoelasticity. The magnetic drive mechanism 6 includes a magnet 61 disposed in the movable body 3 and a coil 62 disposed in the support body 2, and is structured to relatively move the movable body 3 in the axial line direction with respect to the support body 2. As shown in FIGS. 3 and 4, the movable body 3 is connected with the support body 2 through the connection body 10 at respective positions of an end part on one side "L1" in the axial line direction and an end part on the other side "L2" in the axial line direction.

(Support Body)

As shown in FIGS. 2 through 4, the support body 2 includes a case 20 in a tube shape, a first cover member 21 which closes an opening of the case 20 on one side "L1" in the axial line direction, a second cover member 22 which closes an opening of the case 20 on the other side "L2" in the axial line direction, and a coil holder 4 which is disposed between the first cover member 21 and the second cover member 22 on an inner peripheral side of the case 20. In this embodiment, the case 20, the first cover member 21, the second cover member 22 and the coil holder 4 are made of resin. Further, the support body 2 includes a first outer frame part 51 which is fitted to an inner peripheral side of the coil holder 4, and a second outer frame part 52 which is fitted to an inner peripheral side of the case 20 at a position separated to the other side "L2" in the axial line direction from the first outer frame part 51.

(Connection Body)

The connection body 10 includes a first connection body 11 in a ring shape which is joined to an inner peripheral face of the first outer frame part 51, and a second connection body 12 in a ring shape which is joined to an inner peripheral face of the second outer frame part 52. In this embodiment, as described below, the first connection body 11 and the second connection body 12 are gel state members, which are formed by molding gel material, and are joined to the first outer frame part 51 and the second outer frame part 52 by adhesiveness of the gel state member itself.

(Coil Holder)

As shown in FIG. 2, the coil holder 4 is provided with a first outer frame part fixing part 41 in a ring shape, and a body part 42 which is protruded from the first outer frame part fixing part 41 to the other side "L2" in the axial line direction, and a coil 62 is disposed around the body part 42. End parts of a coil wire 63 extended from the coil 62 are bound to two terminal pins 64 which are protruded from the first outer frame part fixing part 41 of the coil holder 4 to an outer side in a radial direction. As shown in FIG. 1, the terminal pins 64 are protruded outside the case 20 and are connected with a wiring board 7.

As shown in FIG. 4, the coil holder 4 is provided with a first step part 44 which positions the first outer frame part 51 in the axial line direction. The first outer frame part fixing part 41 surrounds an outer peripheral side of the first outer frame part 51. An inner peripheral face of the first outer frame part fixing part 41 is provided with a first recessed part 43 which is recessed to the other side "L2" in the axial line direction, and the first outer frame part 51 is press-fitted to the first recessed part 43. The first step part 44 is provided at an end part of the first recessed part 43 on the other side "L2" in the axial line direction. In this embodiment, a ring-shaped step part 511 formed on an outer peripheral face of the first outer frame part 51 is abutted with the first step part 44 in the axial line direction.

(Case)

The case 20 is provided with a main case body 24 in a cylindrical tube shape and a second outer frame part fixing part 25 which is disposed on an inner peripheral side of the main case body 24. The second outer frame part fixing part 25 is disposed at a position separated on the other side "L2" in the axial line direction with respect to the coil holder 4. As shown in FIGS. 2 and 4, the second outer frame part fixing part 25 is protruded to an inner peripheral side from an inner peripheral face of the main case body 24 and is integrally molded with the main case body 24.

As shown in FIGS. 3 and 4, an inner peripheral face of the second outer frame part fixing part 25 is provided with a second recessed part 46 which is recessed to one side "L1" in the axial line direction, and the second outer frame part 52 is press-fitted to the second recessed part 46. The second step part 45 is provided at an end part of the second recessed part 46 on one side "L1" in the axial line direction. In this embodiment, a ring-shaped step part 521 formed on an outer peripheral face of the second outer frame part 52 is abutted with the second step part 45 in the axial line direction.

As shown in FIGS. 1 and 4, an inner peripheral face of the main case body 24 to which the coil holder 4 is fitted is formed with a plurality of groove parts 29 extended in the axial line direction, and a third step part 47 is formed at an end part of each groove part 29 on the other side "L2" in the axial line direction. As shown in FIG. 2, the coil holder 4 is provided with a plurality of protruded parts 49 which are protruded from an outer peripheral face of the first outer frame part fixing part 41. When the support body 2 is to be assembled, each of the protruded parts 49 of the coil holder 4 is fitted to each of the groove parts 29 of the main case body 24 from one side "L1" in the axial line direction and is abutted with the third step part 47 in the axial line direction. As a result, the coil holder 4 is press-fitted and fixed to the main case body 24.

(Cover Member)

As shown in FIGS. 3 and 4, the first cover member 21 is fixed to the main case body 24 from one side "L1" in the axial line direction with respect to the first outer frame part fixing part 41 provided in the coil holder 4. Further, the second cover member 22 is fixed to the main case body 24 from the other side "L2" in the axial line direction with respect to the second outer frame part fixing part 25. As shown in FIG. 2, each of the first cover member 21 and the second cover member 22 is provided with a cover part 26 in a circular shape when viewed in the axial line direction and a plurality of engaging parts 27 disposed on an outer peripheral edge of the cover part 26 at equal intervals in a circumferential direction. In this embodiment, each of the first cover member 21 and the second cover member 22 is provided with three engaging parts 27. The engaging part 27 is a claw part which is extended in a direction inclined from the cover part 26 so as to enlarge to an outer peripheral side.

The engaging part 27 is elastically deformed in a radial direction and is pushed into an inner peripheral side of the main case body 24 together with the cover part 26. The case 20 is provided with a restriction part 28 which restricts the engaging part 27 from disengaging from an inner side of the case 20. The restriction part 28 is a protruded part which is protruded to an inner peripheral side from an end part of the main case body 24. As shown in FIGS. 1 and 2, three restriction parts 28 are disposed at equal intervals at each end part on one side "L1" and the other side "L2" in the axial line direction of the main case body 24. The restriction part 28 is abutted with a tip end of the engaging part 27 in the axial line direction. The first cover member 21 and the second cover member 22 are fixed to the case 20 by an engagement structure of the engaging part 27 with the restriction part 28 and, in addition, by using an adhesive. The first outer frame part fixing part 41 is cut out in portions overlapping in the axial line direction with the three restriction parts 28 provided in the main case body 24. Therefore, when the coil holder 4 is to be inserted into an inside of the main case body 24, an interference of the first outer frame part fixing part 41 with the restriction part 28 is avoided.

(Wiring Board)

As shown in FIG. 2, the case 20 is provided with a cut-out part 65 which is formed by cutting out an edge on one side "L1" in the axial line direction to the other side "L2" in the axial line direction, and a board fixing part 69 which is formed on the other side "L2" of the cut-out part 65. The wiring board 7 is fixed to the board fixing part 69 by an engagement structure, which is structured of a claw part 691 provided at an end part of the board fixing part 69 on one side "L1" in the axial line direction and an engaging groove 692 provided at an end part of the board fixing part 69 on the other side "L2" in the axial line direction and, in addition, by using an adhesive. As shown in FIG. 1, the wiring board 7 is connected with lead wires 8 for power feeding to the coil 62. The board fixing part 69 is provided with a lead wire holding part 80 which holds the lead wires 8 at a position adjacent to the wiring board 7 in a circumferential direction.

When the actuator 1 is assembled, the first outer frame part fixing part 41 of the coil holder 4 is disposed on an inner peripheral side of the cut-out part 65 of the case 20. As shown in FIG. 2, coil wires 63 extended from the coil 62 are bound around root portions of two terminal pins 64 protruded from the first outer frame part fixing part 41. The two terminal pins 64 are protruded to an outer peripheral side of the case 20 through a space between a cover 66, which is extended from a part in a circumferential direction of an outer peripheral edge of the first cover member 21 to the other side "L2" in the axial line direction, and the cut-out part 65 of the case 20, and the two terminal pins 64 are passed through two holes 71 provided in the wiring board 7 to be electrically connected with lands provided at edges of the holes 71.

(Movable Body)

Figure 5:
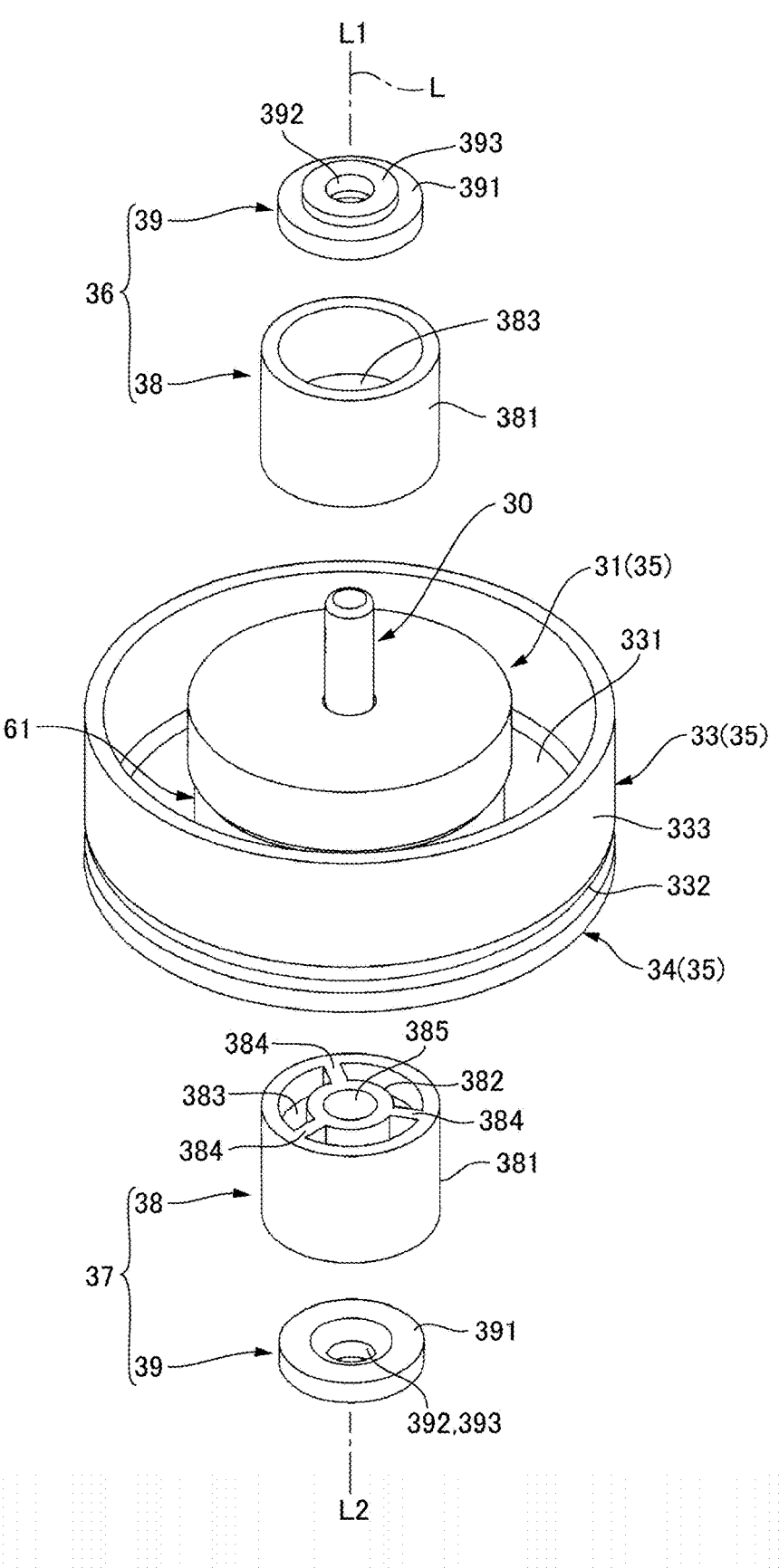
FIG. 5 is an exploded perspective view showing a movable body.

FIG. 5 is an exploded perspective view showing the movable body 3. As shown in FIGS. 3, 4 and 5, the movable body 3 includes a support shaft 30 extended in the axial line direction at a center in a radial direction of the support body 2, a magnet 61 and a yoke 35 which are fixed to a center in the axial line direction of the support shaft 30, a first inner frame part 36 which is fixed to an end part of the support shaft 30 on one side "L1" in the axial line direction, and a second inner frame part 37 which is fixed to an end part of the support shaft 30 on the other side "L2" in the axial line direction. The support shaft 30 is held by the first inner frame part 36 and the second inner frame part 37 from an outer peripheral side. The magnet 61 and the yoke 35 are held at a center in the axial line direction of the support shaft 30 by fixing the first inner frame part 36 and the second inner frame part 37 to the support shaft 30.

The support shaft 30 is a round bar made of metal. The first inner frame part 36 and the second inner frame part 37 have the same structure as each other, and they are disposed in a reverse manner in the axial line direction. Each of the first inner frame part 36 and the second inner frame part 37 includes a first member 38 made of resin and a second member 39 made of metal. The second member 39 is, for example, made of SECC (electrogalvanized steel sheet). In this case, the second member 39 may be formed of metal different from SECC. As shown in FIG. 5, the second member 39 is provided with a circular plate part 391 and a rising part 393 which rises in the axial line direction from an edge of a center hole 392 penetrating through a center of the plate part 391. The second member 39 is a pressed product, and the rising part 393 is formed by burring processing.

As shown in FIGS. 3, 4 and 5, the first member 38 is provided with an outer side tube part 381, an inner side tube part 382 disposed on an inner peripheral side with respect to the outer side tube part 381, and connection parts 383 and 384 which connect the outer side tube part 381 with the inner side tube part 382. The outer side tube part 381 and the inner side tube part 382 are formed in a cylindrical shape and are coaxially disposed with each other. A length (height) in the axial line direction of the inner side tube part 382 is shorter than that of the outer side tube part 381, and the inner side tube part 382 is disposed at an end part of the outer side tube part 381 on one side "L1" or the other side "L2" in the axial line direction. The connection part 383 is formed in a ring shape when viewed in the axial line direction and is protruded from an inner peripheral face of the outer side tube part 381 to an inner peripheral side and is connected with an outer peripheral face of the inner side tube part 382. The connection part 384 is a rib which is radially extended from an outer peripheral face of the inner side tube part 382 and is connected with an inner peripheral face of the outer side tube part 381. As shown in FIG. 5, in this embodiment, three connection parts 384 are disposed at an angular interval of 120°.

In the first inner frame part 36, the inner side tube part 382 is disposed at an end part of the outer side tube part 381 on the other side "L2" in the axial line direction. The connection part 383 is disposed at a substantially center in the axial line direction of the outer side tube part 381 and is connected with an end part of the inner side tube part 382 on one side "L1" in the axial line direction. The second member 39 is fitted into an inner side of the outer side tube part 381 from one side "L1" in the axial line direction.

In the second inner frame part 37, the inner side tube part 382 is disposed at an end part of the outer side tube part 381 on one side "L1" in the axial line direction. The connection part 383 is disposed at a substantially center in the axial line direction of the outer side tube part 381 and is connected with an end part of the inner side tube part 382 on the other side "L2" in the axial line direction. The second member 39 is fitted into an inner side of the outer side tube part 381 from the other side "L2" in the axial line direction.

An outer peripheral face of the first inner frame part 36 is joined to the first connection body 11, and an outer peripheral face of the second inner frame part 37 is joined to the second connection body 12. In this embodiment, the outer peripheral face of the first inner frame part 36 and the outer peripheral face of the second inner frame part 37 are outer peripheral faces of the outer side tube parts 381 of the first members 38. The first connection body 11 and the second connection body 12 are joined to the first members 38 made of resin by adhesiveness of a gel state member itself.

When the first inner frame part 36 and the second inner frame part 37 are to be attached to end parts of the support shaft 30, end parts of the support shaft 30 are passed through shaft holes 385 provided at centers of the first members 38 in a state that the first member 38 and the second member 39 are separated from each other. As described below, when the first connection body 11 and the second connection body 12 are to be manufactured, the first members 38 are respectively integrated with the first connection body 11 and the second connection body 12 by insert molding. Therefore, work of passing an end part of the support shaft 30 through the shaft hole 385 of the first member 38 is performed in a state that the first connection body 11 or the second connection body 12 has been joined to an outer peripheral face of the outer side tube part 381. The shaft hole 385 of the first member 38 is a through hole penetrating through the inner side tube part 382. An inside diameter of the shaft hole 385 is a dimension for fitting the support shaft 30 in a transition fitting state.

Next, the second member 39 is fitted to an inner side of the outer side tube part 381 of the first member 38, and an end part of the support shaft 30 is press-fitted into the center hole 392 of the second member 39 and thereby, the plate part 391 of the second member 39 is made to be abutted with the connection part 383 of the first member 38. As a result, the support shaft 30 is fixed to the first member 38 through the second member 39.

As shown in FIGS. 3 and 4, the magnet 61 is provided with a shaft hole 610 through which the support shaft 30 is penetrated and is fixed to a substantially center in the axial line direction of the support shaft 30. The yoke 35 includes a first yoke 31 overlapped with the magnet 61 on one side "L1" in the axial line direction and a second yoke 32 which is overlapped with the magnet 61 on the other side "L2" in the axial line direction.

A center of the first yoke 31 is provided with a shaft hole 310 through which the support shaft 30 is penetrated. In this embodiment, the first yoke 31 is a magnetic plate whose outside diameter dimension is slightly larger than an outside diameter dimension of the magnet 61 and thus, an outer peripheral face of the first yoke 31 is protruded to an outer side in the radial direction from an outer peripheral face of the magnet 61. The first yoke 31 is fixed to a face on one side "L1" of the magnet 61 by a method of adhesion or the like.

The second yoke 32 is structured of two members, i.e., a first magnetic member 33 in a cup shape and a second magnetic member 34 in a circular plate shape. The first magnetic member 33 is provided with a circular end plate part 331 having a shaft hole 330 through which the support shaft 30 is penetrated, a bent part 332 which is bent to one side "L1" in the axial line direction from an outer edge of the end plate part 331, and a cylindrical tube part 333 which is extended to one side "L1" in the axial line direction from the bent part 332. In this embodiment, the end plate part 331 of the first magnetic member 33 is fixed to an end face of the magnet 61 on the other side "L2" in the axial line direction. The second magnetic member 34 is provided with a shaft hole 340 through which the support shaft 30 is penetrated and is fixed to the end plate part 331 of the first magnetic member 33 on an opposite side to the magnet 61.

The movable body 3 is structured so that the first inner frame part 36 and the second inner frame part 37 are fixed to the support shaft 30 on both sides of the magnet 61 and the yoke 35 in the axial line direction in a state that the support shaft 30 is penetrated through the shaft holes 310, 610, 330 and 340 of the respective members structuring the magnet 61 and the yoke 35. As a result, the first inner frame part 36 supports the magnet 61 and the yoke 35 from one side "L1" in the axial line direction, and the second inner frame part 37 supports the magnet 61 and the yoke 35 from the other side "L2" in the axial line direction and thereby, the magnet 61 and the yoke 35 are fixed to the support shaft 30.

The cylindrical tube part 333 of the second yoke 32 faces an outer peripheral face of the magnet 61 and an outer peripheral face of the first yoke 31 at a position separated to an outer side in the radial direction from the outer peripheral face of the magnet 61 and the outer peripheral face of the first yoke 31. The coil holder 4 is provided with a cylindrical body part 42 which surrounds an outer peripheral side of the magnet 61 and the first yoke 31, and the coil 62 is wound around the body part 42. Therefore, a part of the coil 62 is disposed between the cylindrical tube part 333 and an outer peripheral face of the magnet 61. Further, a part of the coil 62 is disposed between the cylindrical tube part 333 and an outer peripheral face of the first yoke 31.

As shown in FIGS. 2, 3 and 4, the second magnetic member 34 is provided with circular through-holes 341. The through-hole 341 is a weight adjustment part for adjusting weight of the movable body 3. The number and a size of the through-hole 341 is set so that the weight of the second magnetic member 34 is coincided with a designed value without changing an outer shape of the second magnetic member 34.

(Manufacturing Method of Connection Body)

The first connection body 11 and the second connection body 12 are made of a viscoelastic body. For example, as the first connection body 11 and the second connection body 12, the following materials may be used. In other words, a gel state member made of silicone gel or the like, various rubber materials such as natural rubber, diene-based rubber (for example, styrene butadiene rubber, isoprene rubber, butadiene rubber, chloroprene rubber and acrylonitrile butadiene rubber), non-diene-based rubber (for example, butyl rubber, ethylene propylene rubber, ethylene propylene diene rubber, urethane rubber, silicone rubber and fluorine-containing rubber) and thermoplastic elastomer, and their denatured materials. Further, the viscoelastic body which can be used as the connection body 10 may be a composite member made by combining a gel state member, rubber or its denatured material with an elastic body such as a spring.

In this embodiment, the first connection body 11 and the second connection body 12 are made of silicone gel whose penetration degree is from 90 to 110 degrees. The first connection body 11 and the second connection body 12 are manufactured by a method in which gel material is filled and cured in a mold (by casting). When the first connection body 11 is to be molded, the first member 38 of the first inner frame part 36 and the first outer frame part 51 are coaxially positioned by a jig to form a ring-shaped space between the first outer frame part 51 and the first member 38, and gel material is filled and thermally cured in the space. As a result, the first connection body 11 is joined to an inner peripheral face of the first outer frame part 51 and an outer peripheral face of the first member 38 by adhesiveness of the gel state member itself. In this case, joining strength can be increased by applying a joining accelerating agent such as primer on the inner peripheral face of the first outer frame part 51 and the outer peripheral face of the first member 38 before gel material is filled.

The second connection body 12 is similarly molded so that a ring-shaped space is formed between the first member 38 of the second inner frame part 37 and the second outer frame part 52 and gel material is filled and thermally cured in the space. Therefore, when the actuator 1 is to be assembled, the support body 2 and the movable body 3 can be connected with each other without performing a step for adhesively bonding a gel state member.

(Operation of Actuator)

In the actuator 1, the magnetic drive mechanism 6 generates a drive force for driving the movable body 3 in the axial line direction by supplying an electric current to the coil 62. When the energization to the coil 62 is cut off, the movable body 3 is returned to a home position by a return force of the connection body 10. Therefore, when energization to the coil 62 is intermittently performed, the movable body 3 vibrates in the axial line direction. Further, when an AC waveform which is applied to the coil 62 is adjusted, an acceleration at which the movable body 3 is moved to one side "L1" in the axial line direction and an acceleration at which the movable body 3 is moved to the other side "L2" in the axial line direction can be made different from each other. Therefore, a person who holds an apparatus to which the actuator 1 is attached as a tactile device is capable of bodily sensing vibration having directivity in the axial line direction. Further, a speaker can be structured by utilizing the actuator 1.

In this embodiment, the connection body 10 is disposed at a position where the support body 2 and the movable body 3 face each other in a first direction (radial direction), and the movable body 3 is vibrated in a second direction (axial line direction) which intersects the first direction (radial direction). When the movable body 3 is vibrated in the second direction (axial line direction) with respect to the support body 2, the first connection body 11 and the second connection body 12 follow the vibration of the movable body 3 and deform in a shearing direction. A gel state member such as silicone gel is provided with linear or nonlinear expansion and contraction characteristics according to its expansion and contraction direction. When a gel state member is deformed in a shearing direction, the gel state member is provided with deformation characteristics whose linear component is larger than its non-linear component. Therefore, when the movable body 3 is vibrated in the axial line direction with respect to the support body 2, the first connection body 11 and the second connection body 12 are deformed in a range where linearity is high and thus, vibration characteristics whose linearity is satisfactory can be obtained.

On the other hand, when the movable body 3 is moved in the radial direction, the first connection body 11 and the second connection body 12 are deformed in a crushing direction. In this case, a spring constant when a gel state member is deformed in a crushing direction is about three times of a spring constant when the gel state member is deformed in a shearing direction. Therefore, the movable body 3 can be suppressed from moving in a direction different from a vibration direction (axial line direction) and the movable body 3 and the support body 2 can be prevented from colliding with each other.

Principal Effects in this Embodiment

As described above, the actuator 1 in this embodiment includes the support body 2 having the case 20 in a tube shape and the first outer frame part 51 and the second outer frame part 52 which are disposed on an inner side with respect to the case 20, the movable body 3 having the support shaft 30 disposed at a center of the case 20 and the first inner frame part 36 and the second inner frame part 37 which holds the support shaft 30 from an outer peripheral side, the first connection body 11 which is connected with the first outer frame part 51 and the first inner frame part 36 and having at least one of elasticity and viscoelasticity, and the second connection body 12 which is connected with the second outer frame part 52 and the second inner frame part 37 and having at least one of elasticity and viscoelasticity, and the magnetic drive mechanism 6 which includes the magnet 61 and the coil 62 and is structured to relatively move the movable body 3 in the axial line direction of the support shaft 30 with respect to the support body 2. The first inner frame part 36 includes the first member 38 made of resin whose outer peripheral face is connected with the first connection body 11 and the second member 39 made of metal which is press-fitted to an inner side of the first member 38. Similarly, the second inner frame part 37 includes the first member 38 made of resin whose outer peripheral face is connected with the second connection body 12 and the second member 39 made of metal which is fitted to an inner side of the first member 38. In each of the first inner frame part 36 and the second inner frame part 37, the support shaft 30 is fixed to the first member 38 through the second member 39 by press-fitting the support shaft 30 to the center hole 392 of the second member 39.

According to this embodiment, each of the first inner frame part 36 and the second inner frame part 37 which are provided in the movable body 3 is structured by assembling two separate members, i.e., a part (first member 38 made of resin) which is connected the first connection body 11 or the second connection body 12, and a part (second member 39 made of metal) to which the support shaft 30 is press-fitted. Therefore, a size of a metal part (second member 39) for securing fixed strength to the support shaft 30 can be reduced and thus, in comparison with a case that the entire first inner frame part 36 and the entire second inner frame part 37 are made of metal, a component cost can be reduced. Further, a part (second member) to which the support shaft

30 is press-fitted and fixed is capable of separating and dividing from a part (first member 38) having been connected with the first connection body 11 or the second connection body 12 which is a gel state member. Therefore, in the press-fitting step, a part (second member 39) to which a gel state member is not joined is held by a jig and the press-fitting step is performed and thus, handling of parts is easy and the gel state member (first connection body 11 and second connection body 12) may not be damaged. As a result, a component cost of the first inner frame part 36 and the second inner frame part 37 can be reduced, fixed strength of the first inner frame part 36 and the second inner frame part 37 to the support shaft 30 is secured, and the actuator 1 can be easily assembled.

In this embodiment, the second member 39 is a pressed product provided with the plate part 391 in a flat plate shape and the rising part 393 which rises from an edge of the center hole 392 penetrating through a center of the plate part 391, and the support shaft 30 is press-fitted to the center hole 392 and an inner side of the rising part 393. Therefore, a manufacturing cost of the second member 39 is low and thus, the component cost can be reduced. Further, the rising part 393 is provided by burring processing and thus, a press-fitting margin when the support shaft 30 is to be press-fitted and fixed can be secured. Therefore, fixed strength of the support shaft 30 to the second member 39 can be secured.

In this embodiment, the first member 38 is provided with the outer side tube part 381 whose outer peripheral face is connected with the first connection body 11 or the second connection body 12, the inner side tube part 382 which is disposed on an inner side with respect to the outer side tube part 381, and the connection parts 383 and 384 which are protruded from an inner peripheral face of the outer side tube part 381 and are connected with the inner side tube part 382. The second member 39 is press-fitted to an inner side of the outer side tube part 381. The support shaft 30 is fitted to an inner side of the inner side tube part 382 in a transition fitting state. According to this structure, the support shaft 30 and the first member 38 can be easily assembled and thus, even in a state that a gel state member has been joined to the first member 38, the gel state member may not be damaged. Further, when the first member 38 is to be manufactured, a thickness removal part can be provided between the outer side tube part 381 and the inner side tube part 382 and thus, a wall thickness of a portion to which the support shaft 30 is fitted is prevented from becoming too large. Therefore, molding defects can be suppressed. In this embodiment, a wall thickness of the outer side tube part 381 and a wall thickness of the inner side tube part 382 are set to be substantially the same as each other and thus, uniformity of the wall thicknesses of respective parts of the first member 38 is high. Therefore, molding defects can be suppressed.

In this embodiment, the first connection body 11 and the second connection body 12 are gel state members such as silicone gel. A gel state member is a viscoelastic body and, when the gel state member is deformed in a shearing direction, a linear component of its spring constant is larger than a non-linear component and thus, vibration characteristics of the movable body 3 whose linearity is satisfactory can be obtained. Further, a spring constant when a gel state member is deformed in a compression direction becomes about three times of a spring constant when deformed in a shearing direction and thus, the movable body 3 is suppressed from moving in a direction different from a vibration direction. Therefore, collision of the movable body 3 with the support body 2 can be suppressed.

In this embodiment, a damper member in which the first inner frame part 36 and the first outer frame part 51 are connected with each other through the first connection body 11 and a damper member in which the second inner frame part 37 and the second outer frame part 52 are connected with each other through the second connection body 12 are disposed at both ends in the axial line direction of the support shaft 30. Therefore, the movable body 3 can be held at both ends in the axial line direction through the first connection body 11 and the second connection body 12 and thus, the movable body 3 can be stably vibrated.

In this embodiment, the coil 62 is disposed in the support body 2, and the movable body 3 includes the magnet 61 disposed on an inner side with respect to the coil 62 and the yoke 35 overlapped with the magnet 61 in the axial line direction, and the support shaft 30 is penetrated through the centers of the magnet 61 and the yoke 35. Therefore, weight of the movable body 3 can be secured by the magnet 61 and the yoke 35 and thus, strong vibration can be outputted from the actuator 1.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An actuator comprising:
   a support body comprising a case in a tube shape and an outer frame part disposed on an inner side with respect to the case;
   a movable body comprising a support shaft which is disposed at a center of the case and an inner frame part which holds the support shaft from an outer peripheral side;
   a connection body which is connected with the outer frame part and the inner frame part and has at least one of elasticity and viscoelasticity; and
   a magnetic drive mechanism which comprises a magnet and a coil and is structured to relatively move the movable body in an axial line direction of the support shaft with respect to the support body;
   wherein the inner frame part comprises a first member made of resin whose outer peripheral face is connected with the connection body and a second member made of metal which is fitted to an inner side of the first member; and
   the support shaft is fixed to the first member through the second member by press-fitting the support shaft to a center hole of the second member.

2. The actuator according to claim 1, wherein the second member is a pressed product which comprises a plate part in a flat plate shape and a rising part which rises from an edge of the center hole penetrating through a center of the plate part.

3. The actuator according to claim 1, wherein
   the first member comprises:
      an outer side tube part whose outer peripheral face is connected with the connection body;
      an inner side tube part which is disposed on an inner side with respect to the outer side tube part; and
      a connection part which is protruded from an inner peripheral face of the outer side tube part and is connected with the inner side tube part,
   the second member is fitted to an inner side of the outer side tube part, and
   the support shaft is fitted to an inner side of the inner side tube part in a transition fitting state.

4. The actuator according to claim 3, wherein a wall thickness of the outer side tube part and a wall thickness of the inner side tube part are substantially same as each other.

5. The actuator according to claim 1, wherein the connection body is a gel state member.

6. The actuator according to claim 1, wherein the inner frame part, the connection body and the outer frame part are disposed at both ends in the axial line direction of the support shaft.

7. The actuator according to claim 1, wherein
   the coil is disposed in the support body,
   the movable body comprises the magnet disposed on an inner side with respect to the coil and a yoke overlapped in the axial line direction with the magnet, and
   the support shaft penetrates through centers of the magnet and the yoke.

* * * * *